United States Patent
Li et al.

(10) Patent No.: US 11,736,562 B1
(45) Date of Patent: Aug. 22, 2023

(54) METHOD AND SYSTEM FOR ACHIEVING HIGH AVAILABILITY OF SERVICE UNDER HIGH-LOAD SCENE IN DISTRIBUTED SYSTEM

(71) Applicant: INSPUR SUZHOU INTELLIGENT TECHNOLOGY CO., LTD., Jiangsu (CN)

(72) Inventors: Juan Li, Jiangsu (CN); Kun Guo, Jiangsu (CN); Haijun Zhang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/013,146

(22) PCT Filed: Feb. 20, 2021

(86) PCT No.: PCT/CN2021/076981
§ 371 (c)(1),
(2) Date: Dec. 27, 2022

(87) PCT Pub. No.: WO2022/021858
PCT Pub. Date: Feb. 3, 2022

(30) Foreign Application Priority Data

Jul. 29, 2020 (CN) .......................... 202010741416.4

(51) Int. Cl.
*H04L 67/1017* (2022.01)
*H04L 67/1097* (2022.01)

(52) U.S. Cl.
CPC ...... *H04L 67/1017* (2013.01); *H04L 67/1097* (2013.01)

(58) Field of Classification Search
CPC . H04L 2012/68; H04L 67/1036; H04L 67/00; H04L 67/1001; H04L 67/1004;
(Continued)

(56) References Cited

U.S. PATENT DOCUMENTS

| 2013/0237216 A1* | 9/2013 | Ong .................. H04W 8/005 455/434 |
| 2016/0140001 A1* | 5/2016 | Kulkarni ............ G06F 11/3006 714/4.12 |
| 2018/0068358 A1 | 3/2018 | Hoffberg |

FOREIGN PATENT DOCUMENTS

| CN | 103248622 A | 8/2013 |
| CN | 103631878 A | 3/2014 |

(Continued)

OTHER PUBLICATIONS

Search report for International application No. PCT/CN2021/076981 dated May 19, 2021.
(Continued)

*Primary Examiner* — Shean Tokuta
(74) *Attorney, Agent, or Firm* — Dennemeyer & Associates LLC; Victoria Friedman

(57) ABSTRACT

Provided are a method and system for achieving high availability of service under a high-load scene in a distributed system. The method includes constructing a node selection model at a master node of a distributed cluster; constructing a request selection model in each slave node; wherein the request selection model includes weights of designated requests and trade-off parameters set for requests each having a weight greater than a set value; when the distributed system enters the high-load scene, reading, by the master node, the node selection model, and sequentially selecting the served slave nodes according to a time slice round robin policy; and reading, by each slave node, the request selection model, and sequentially returning data of
(Continued)

each request according to the trade-off parameters of each request.

20 Claims, 2 Drawing Sheets

(58) Field of Classification Search
CPC .......... H04L 47/125; H04N 21/23103; H04W 28/084; H02J 1/14; G06F 9/50; G06F 9/505; G06F 9/5083
See application file for complete search history.

(56) References Cited

FOREIGN PATENT DOCUMENTS

| | | | | | |
|---|---|---|---|---|---|
| CN | 107567706 | A | * | 1/2018 | ......... H04L 41/0816 |
| CN | 108156235 | A | * | 6/2018 | |
| CN | 108241534 | A | | 7/2018 | |
| CN | 109831831 | A | * | 5/2019 | |
| CN | 110636388 | A | | 12/2019 | |
| CN | 112003900 | A | * | 11/2020 | ............. H04L 67/10 |
| CN | 112003900 | A | | 11/2020 | |
| CN | 112817728 | A | * | 5/2021 | ............. G06F 16/27 |
| CN | 112003900 | B | * | 5/2022 | ............. H04L 67/10 |
| CN | 115426393 | A | * | 12/2022 | |
| JP | 2016158084 | A | * | 9/2016 | |
| WO | WO-2012169105 | A1 | * | 12/2012 | ............. H01Q 15/14 |
| WO | WO-2022021858 | A1 | * | 2/2022 | ............. H04L 67/10 |

OTHER PUBLICATIONS

Search report for Chinese application 202010741416.4, filed Jul. 29, 2020.

* cited by examiner

| Request | Weight | Trade-off parameter | Full parameter |
|---|---|---|---|
| A | 10 | {Parameter 1, Parameter 2} | {Parameter 1, Parameter 2,Parameter 3,Parameter 4,Parameter 5} |
| B | 10 | {Parameter 1, Parameter 2} | {Parameter 1, Parameter 2,Parameter 3,Parameter 4,Parameter 5} |
| C | 8 | {Parameter 1, Parameter 2,Parameter 3} | {Parameter 1, Parameter 2,Parameter 3,Parameter 4,Parameter 5}{Parameter 1, Parameter 2,Parameter 3} |
| ••• | ••• | | |

METHOD AND SYSTEM FOR ACHIEVING HIGH AVAILABILITY OF SERVICE UNDER HIGH-LOAD SCENE IN DISTRIBUTED SYSTEM

CROSS-REFERENCE TO RELATED APPLICATIONS

This is a 35 U.S.C. 371 National Stage Patent Application of International Application No. PCT/CN2021/076981, filed Feb. 20, 2021, which claims priority to Chinese application 202010741416.4, filed Jul. 29, 2020, each of which is hereby incorporated by reference in its entirety.

TECHNICAL FIELD

The present disclosure relates to the technical field of high availability of service of a distributed storage system, and in particular, relates to a method and system for achieving high availability of service under a high-load scene in a distributed system.

BACKGROUND

In a distributed storage system, under a high-load pressure, how to ensure the system not to undergo crashes or downtime is a key high availability standard of the distributed storage system. Most solutions for solving high-load are to perform shunting in advance so as to alleviate the pressure of a certain server; however, in practical scenes, high-load is an inevitable situation. How to ensure that user service is still available under a high-load situation is a problem that must be solved in a distributed storage system.

SUMMARY

Aiming at the problem that must be solved in a distributed storage system, i.e. how to ensure that user service is still available under a high-load situation, some embodiments of the present disclosure provide a method and system for achieving high availability of service under a high-load scene in a distributed system. The technical solutions of some embodiments of the present disclosure are provided, In one aspect, the technical solutions of some embodiments of the present disclosure provide a method for achieving high availability of service under a high-load scene in a distributed system, including the following steps:

constructing a node selection model at a master node of a distributed cluster; wherein the node selection model is used for the master node to select, from the node selection model, served slave nodes and the sequence at which the slave nodes are served;

constructing a request selection model in each slave node; wherein the request selection model includes weights of designated requests and trade-off parameters set for requests each having a weight greater than a set value; the request selection model is used for each slave node to select, from the request selection model, responded requests and the sequence of the responded requests;

when the distributed system enters the high-load scene, reading, by the master node, the node selection model, and sequentially selecting the served slave nodes according to a time slice round robin policy; wherein the master node uses time slice round robin to ensure that each node can be served; and reading, by each slave node, the request selection model, and sequentially returning data of each request according to the trade-off parameters of each request; wherein the policy of trade-off parameters of requests in each slave node ensures that each slave node does not get down, and reduces the load of the whole system to the greatest extent, thereby achieving the availability of the whole cluster.

In an embodiment, the step of constructing a node selection model at a master node of a distributed cluster includes:

providing a monitor on the master node to monitor the source of each request, the data size of each request, and the total time of each request;

when a load of the system is normal, periodically and statistically analyzing the number of times of requests, the type of the requests, and the data size and average time of the requests of each slave node, and calculating the average number of times of requests, the average data size of the requests and the average total time of the requests of each hour of different slave nodes; and sorting corresponding slave nodes according to the number of times of requests to form the node selection model. The construction of the node selection model is achieved on the master node. By monitoring the source of each request, the data size of each request and the total time of each request on the master node, the average number of times of requests, the average data size of the requests and the average total time of the requests during each hour are calculated, a node selection model based on the number of times of requests and the average data size of the requests is obtained.

In an embodiment, the step of sorting corresponding slave nodes according to the number of times of requests to form the node selection model further includes:

sorting the corresponding slave nodes according to the number of times of requests, and when the number of times of requests is the same, sorting the corresponding slave nodes according to the average data size of the requests to form the node selection model. In an embodiment, the slave nodes are served according to a descending order of the number of times of requests of the slave nodes; and for slave nodes having the same number of times of requests, the slave nodes are served according to an ascending order of the average data size of requests of the slave nodes.

In an embodiment, the step of constructing a request selection model in each slave node includes:

setting weights for different requests according to service importance degrees thereof;

setting trade-off parameters for each request with a weight greater than or equal to a set threshold; and sorting corresponding requests according to the sizes of the weights to form the request selection model. The construction of the request selection model is on each slave node. Weight values of requests are set for requests of each slave node, and the greater the weight value is, the more important the basic service processing of the request is to the node. For a request with a weight greater than a set threshold, a trade-off parameter policy is set, the parameter policy specifying the minimum response parameter satisfaction degree available to the request.

In an embodiment, before the step of when the distributed system enters the high-load scene, reading, by the master node, the node selection model, and sequentially selecting the served slave nodes according to a time slice round robin policy, the method includes:

when the distributed system enters the high-load scene, stopping, by the master node, monitoring and calculation on the requests of each slave node. In a high-load scene, monitoring of the master node can be turned off at any time, so as to reduce the coupling degree of the whole system, and reduce the loss of the cluster itself caused by the whole technology model.

In an embodiment, in the step of reading, by the master node, the node selection model, and sequentially selecting the served slave nodes according to a time slice round robin policy, the time slice served by each salve node=(the number of times of requests/the number of total nodes)×the average total time of the requests×1/N, where N is an integer greater than 3.

On the other aspect, the technical solutions of some embodiments of the present disclosure provide a system for achieving high availability of service under a high-load scene in a distributed system, including a master node, several slave nodes, a node selection model construction module and request selection model construction modules;

the node selection model construction module is configured to construct a node selection model at a master node of a distributed cluster; the node selection model is used for the master node to select, from the node selection model, served slave nodes and the sequence at which the slave nodes are served;

each request selection model construction module is configured to construct a request selection model in each slave node; wherein the request selection model includes weights of designated requests and trade-off parameters set for requests each having a weight greater than a set value; and each request selection model is used for each slave node to select, from the request selection model, responded requests and the sequence of the responded requests;

the master node is configured to read the node selection model when the distributed system enters the high-load scene, and sequentially select the served slave nodes according to a time slice round robin policy; and each slave node is configured to read the request selection model, and sequentially return data of each request according to the trade-off parameters of each request.

In an embodiment, the node selection model construction module includes a calculation processor, a node selection model generator and a monitor which is provided on the master node;

the monitor is configured to monitor the source of each request, the data size of each request, and the total time of each request;

the calculation processor is configured to when a load of the system is normal, periodically and statistically analyze the number of times of requests, the type of the requests, and the data size and average time of the requests of each slave node, and calculate the average number of times of requests, the average data size of the requests and the average total time of the requests of each hour of different slave nodes; and the node selection model generator is configured to sort corresponding slave nodes according to the number of times of requests to form the node selection model.

In an embodiment, the node selection model generator is specifically configured to sort the corresponding slave nodes according to the number of times of requests, and when the number of times of requests is the same, sort the corresponding slave nodes according to the average data size of the requests to form the node selection model.

In an embodiment, each request selection model construction module includes a weight setter, a trade-off parameter setter, and a request selection model generator;

the weight setter is configured to set weights for different requests according to service importance degrees thereof;

the trade-off parameter setter is configured to set trade-off parameters for each request with a weight greater than or equal to a set threshold; and the request selection model generator is configured to sort corresponding requests according to the sizes of the weights to form the request selection model.

It can be determined from the technical solutions that the present disclosure has the following advantages: the construction of models are distributed on the master node and slave nodes, and in a high-load scene, monitoring of the master node can be turned off at any time, so as to reduce the coupling degree of the whole system, and reduce the loss of the cluster itself caused by the whole technology model. The model of the master node is calculated according to actual requests, and the models of the slave nodes are set according to specific service scenes, and thus the construction and selection of the whole technology model is more suitable for actual storage services, and data obtained is more accurate. The master node uses time slice round robin to ensure that each node can be served, and the policy of trade-off of requests in each slave node ensures that each slave node does not get down, and reduces the load of the whole system to the greatest extent, thereby achieving the availability of the whole cluster.

In addition, the present disclosure has a reliable design principle, a simple structure, and has a very broad application prospect.

Hence, compared with the related art, the present disclosure has prominent substantive features and notable progress, and the beneficial effects of implementation thereof are also obvious.

BRIEF DESCRIPTION OF THE DRAWINGS

In order to describe the technical solutions in the embodiments of the present disclosure or in the related art more clearly, hereinafter, accompanying drawings requiring to be used for describing the embodiments or the related art are introduced briefly. Obviously, for a person of ordinary skill in the art, other accompanying drawings may also be obtained according to these accompanying drawings without any inventive effort.

DETAILED DESCRIPTION OF THE EMBODIMENTS

Hereinafter, in order to make a person skilled in the art better understand the technical solutions of some embodiments of the present disclosure, the technical solutions in the embodiments of the present disclosure are described clearly and completely with reference to the drawings in the embodiments of the present disclosure. Obviously, the embodiments as described are only parts of embodiments of the present disclosure rather than all the embodiments. All other embodiments obtained by a person of ordinary skill in the art on the basis of the embodiments of the present disclosure without any inventive effort shall all fall within the scope of protection of the present disclosure.

Figures 1, 2:
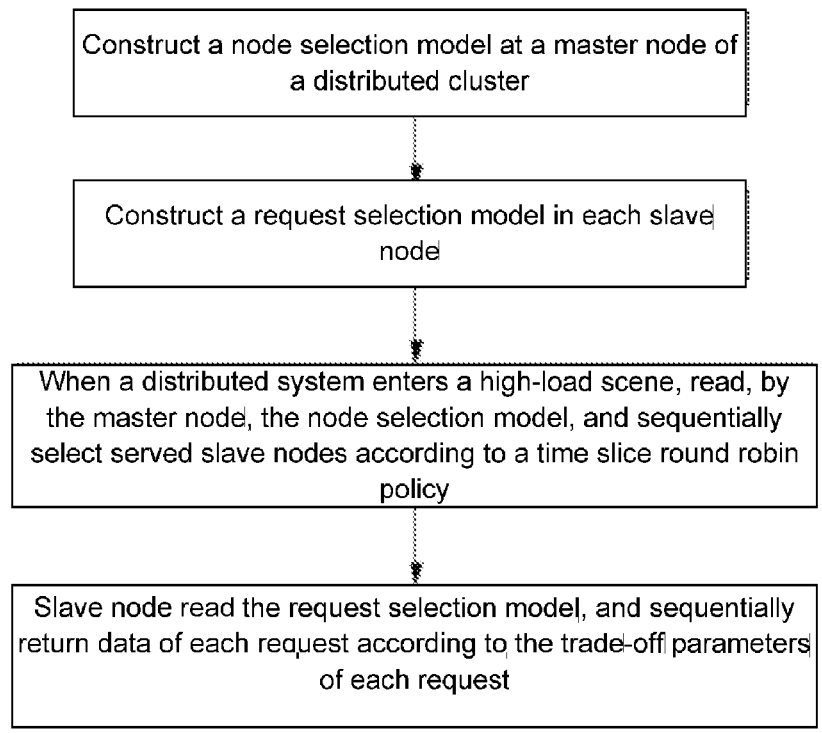
FIG. 1 is a schematic flowchart of a method according to some embodiments of the present disclosure.
FIG. 2 is an exemplary diagram of a node selection model according to an embodiment of the present disclosure.

As shown in FIG. 1, embodiments of the present disclosure provide a method for achieving high availability of service under a high-load scene in a distributed system, including the following steps:

S1: constructing a node selection model at a master node of a distributed cluster; wherein the node selection model is used for the master node to select, from the node selection model, served slave nodes and the sequence at which the slave nodes are served; and the node selection model is constructed in the master node, to obtain node selection basis and a duration of each node being each served.

S2: constructing a request selection model in each slave node; wherein the request selection model includes weights of designated requests and trade-off parameters set for requests each having a weight greater than a set value; and the request selection model is used for each slave node to select, from the request selection model, responded requests and the sequence of the responded requests; the request selection model is constructed in each slave node, so as to obtain the priority of each request being responded to and the minimum satisfaction degree of the data size returned in each response.

S3: when the distributed system enters the high-load scene, reading, by the master node, the node selection model, and sequentially selecting the served slave nodes according to a time slice round robin policy; wherein the master node uses time slice round robin to ensure that each node can be served; and when the distributed system enters the high-load scene, first according to the node selection model in the master node, the served slave nodes are selected according to the sequence in the model and the time slice round robin policy, and the round robin time of each time slice is calculated according to the node selection model.

S4: reading, by each slave node, the request selection model, and sequentially returning data of each request according to the trade-off parameters of each request; wherein the policy of trade-off parameters of requests in each slave node ensures that each slave node does not get down, and reduces the load of the whole system to the greatest extent, and then according to each slave node, the sequence in a request model queue, and the trade-off policy, data of each request is returned, thereby ensuring high availability of the whole service.

In some embodiments, the step of constructing a node selection model at a master node of a distributed cluster includes:

providing a monitor on the master node to monitor the source of each request, the data size of each request, and the total time of each request;

when a load of the system is normal, periodically and statistically analyzing the number of times of requests, the type of the requests, and the data size and average time of the requests of each slave node, and calculating the average number of times of requests, the average data size of the requests and the average total time of the requests of each hour of different slave nodes; and sorting corresponding slave nodes according to the number of times of requests to form the node selection model. The construction of the node selection model is achieved on the master node. By monitoring the source of each request, the data size of each request and the total time of each request on the master node, the average number of times of requests, the average data size of the requests and the average total time of the requests during each hour are calculated, a node selection model based on the number of times of requests and the average data size of the requests is obtained.

First, the master node serves as a monitoring point, records and captures all requests processed by the master node; calculates the sources of requests thereof, the data size of the requests and the total time of the requests; and then constructs a reference request model under different slave nodes, different request types and different returned data sizes by taking the sources of the requests and the size of data returned by the requests as division basis.

In some embodiments, the step of sorting corresponding slave nodes according to the number of times of requests to form the node selection model further includes:

sorting the corresponding slave nodes according to the number of times of requests, and if the number of times of requests is the same, sorting the corresponding slave nodes according to the average data size of the requests to form the node selection model. In an embodiment, the slave nodes are served according to a descending order of the number of times of requests of the slave nodes; and for slave nodes having the same number of times of requests, the slave nodes are served according to an ascending order of the average data size of requests of the slave nodes.

In some embodiments, the step of constructing a request selection model in each slave node includes:

setting weights for different requests according to service importance degrees thereof; here, the weights are set as 10-0;

setting trade-off parameters for each request with a weight greater than or equal to a set threshold; then, with regard to each request with a weight of 5 or 5 and more, setting a trade-off parameter set, in which the trade-off parameter policy only functions under a high-load scene, and the parameter set specifies the minimum satisfaction degree policy of the master node to the request under the high-load scene; and sorting corresponding requests according to the sizes of the weights to form the request selection model. The construction of the request selection model is on each slave node. In slave nodes of the distributed system, for each request sent to the master node, the weight degrees of requests of each slave node are set according to actual service thereof. The higher the weight is, the more important the request is to service availability. In a high-load, it needs to continuously ensure that a request with a lower weight has lower importance degree, and can be responded to in a delayed manner in a high-load environment. Moreover, for each request, according to specific service scene thereof, a return trade-off parameter policy is set, in which the trade-off parameter policy is a minimum parameter satisfaction degree for normal service operation.

In some embodiments, before the step of when the distributed system enters the high-load scene, reading, by the master node, the node selection model, and sequentially selecting the served slave nodes according to a time slice round robin policy, the method includes:

when the distributed system enters the high-load scene, the master node stop monitoring and calculation on the requests of each slave node. In a high-load scene, monitoring of the master node can be turned off at any time, so as to reduce the coupling degree of the whole system, and reduce the loss of the cluster itself caused by the whole technology model.

In some embodiments, when the distributed cluster enters the high-load scene, the master node first selects, according to the node selection model, the sequence at which nodes are served, the specific services are based on a time slice round robin policy, and the time served by each node is calculated according to formula: (the number of times of requests/the number of total nodes)×the average total time of the requests×1/5. For slave nodes which are selected to be served, first according to weights of requests, requests preferentially responded to are selected, and then according to the trade-off parameter policy, parameters of the minimum data size satisfied by the service are returned. In this way, normal operation of each node of the distributed cluster under a high-load environment is achieved.

Figures 3, 4:
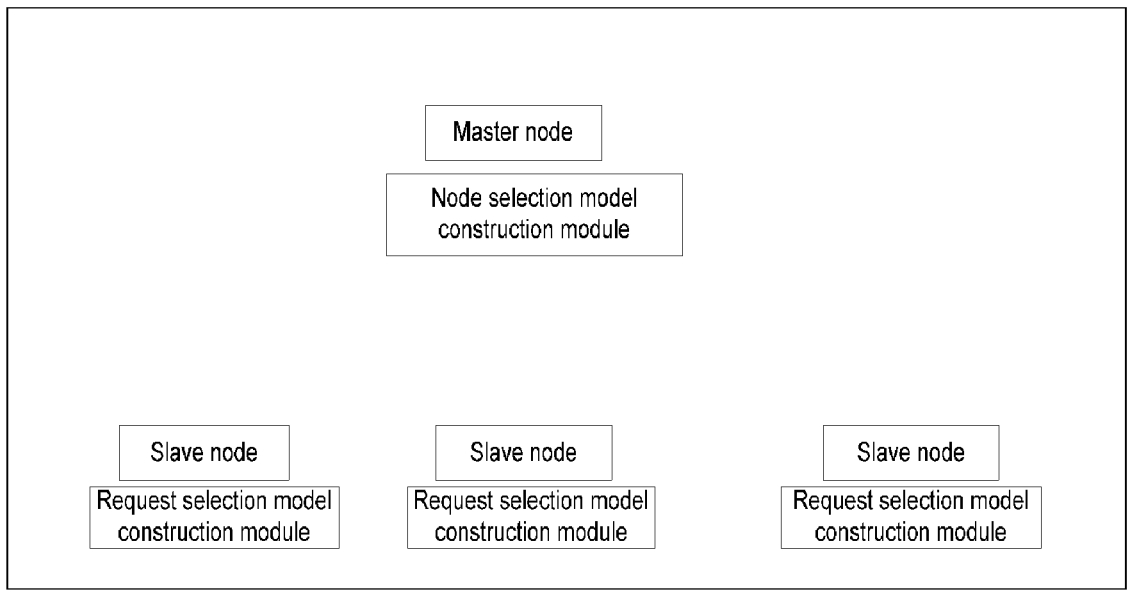
FIG. 3 is an exemplary diagram of a request selection model according to an embodiment of the present disclosure.
FIG. 4 is a schematic block diagram of a system according to some embodiments of the present disclosure.

As shown in FIG. 2, the node selection model on the master node includes the number of times of requests, the average data size of requests of each node, and the average time of the requests per hour. Moreover, the arrangement sequence of slave nodes is first according to the number of times of requests, and slave nodes having higher number of times of requests are arranged at relatively front positions; and if the number of times of requests is the same, according to the average data size of the requests, slave nodes having lower average data size are arranged at the front positions. For the request selection model on each slave node, as shown in FIG. 3, the weight of each request is designated, and for requests with weights greater than 5, trade-off parameters and full parameters of the requests are set. The slave nodes perform requests according to first come first served policy in a normal situation of the cluster; however, in a high-load cluster, requests to be sent will be sorted according to a priority level of weights; and requests with weights less than 5 are internally ignored, and for the same priority level, the slave nodes are sorted according to a first come first served principle.

When the distributed cluster is in the high-load scene, the master node first disables the monitoring and calculation on service object models of the master node, to reduce service consumption. Then the node selection model is read, and the arrangement nodes are served in sequence according to a time slice round robin method, wherein the time of a time slice served by each node is (the number of times of requests/the number of total nodes)×the average total time of the requests×1/5. For each node, a request queue is read, and responding is made according to specified contents of the trade-off parameters of parameters of each request. In this way, high availability of service of the whole cluster is ensured.

As shown in FIG. 4, embodiments of the present disclosure provide a system for achieving high availability of service under a high-load scene in a distributed system, including a master node, several slave nodes, a node selection model construction module and request selection model construction modules;

the node selection model construction module is configured to construct a node selection model at a master node of a distributed cluster; the node selection model is used for the master node to select, from the node selection model, served slave nodes and the sequence at which the slave nodes are served;

each request selection model construction module is configured to construct a request selection model in each slave node; wherein the request selection model includes weights of designated requests and trade-off parameters set for requests each having a weight greater than a set value; and each request selection model is used for each slave node to select responded requests from the request selection model, and select the sequence of the responded requests according to the sizes of the weights;

the master node is configured to read the node selection model when the distributed system enters the high-load scene, and sequentially select the served slave nodes according to a time slice round robin policy; and each slave node is configured to read the request selection model, and sequentially return data of each request according to the trade-off parameters of each request.

In some embodiments, the node selection model construction module includes a calculation processor, a node selection model generator and a monitor which is provided on the master node;

the monitor is configured to monitor the source of each request, the data size of each request, and the total time of each request;

the calculation processor is configured to when a load of the system is normal, periodically and statistically analyze the number of times of requests, the type of the requests, and the data size and average time of the requests of each slave node, and calculate the average number of times of requests, the average data size of the requests and the average total time of the requests of each hour of different slave nodes; and the node selection model generator is configured to sort corresponding slave nodes according to the number of times of requests to form the node selection model.

In some embodiments, the node selection model generator is specifically configured to sort the corresponding slave nodes according to the number of times of requests, and if the number of times of requests is the same, sort the corresponding slave nodes according to the average data size of the requests to form the node selection model.

In some embodiments, each request selection model construction module includes a weight setter, a trade-off parameter setter, and a request selection model generator;

the weight setter is configured to set weights for different requests according to service importance degrees thereof;

the trade-off parameter setter is configured to set trade-off parameters for each request with a weight greater than or equal to a set threshold; and the request selection model generator is configured to sort corresponding requests according to the sizes of the weights to form the request selection model.

The node selection model is used as a reference basis for the master node to serve each slave node under a high-load scene. The request selection model is used as a basis for each request in each slave node to be served under a high-load scene. Under a high-load scene, high-load cluster service technology selects served nodes with reference to the node selection model; and for each served slave node, a request for a specific service is selected by the request thereof responding to the model. In this way, high availability of the whole system is achieved.

The construction of the node selection model is achieved on the master node. By monitoring the source of each request, the data size of each request and the total time of each request on the master node, a node selection model based on the number of times of requests and the data size of the requests is obtained. The construction of the request selection model is on each slave node. Weight values of requests are set for requests of each slave node, and the greater the weight value is, the more important the basic service processing of the request is to the node. For a request with a weight greater than 5, a trade-off parameter policy is set, the parameter policy specifying the minimum response parameter satisfaction degree available to the request.

Although the present disclosure is described in detail with reference to the accompanying drawings in combination with preferred embodiments, the present disclosure is not limited thereto. A person of ordinary skill in the art may make various equivalent modifications or replacements to the embodiments of the present disclosure without departing from the spirit and essence of the present disclosure, and these modifications or replacements shall fall within the scope of protection of the present disclosure. A person skilled in the art would have readily conceived of variations or replacements within the technical scope disclosed in the present disclosure, and the variations or replacements shall all fall within the scope of protection of the present disclosure. Thus, the scope of protection of the present disclosure shall be subject to the scope of protection of the claims.

What is claimed is:

1. A method for achieving high availability of service under a high-load scene in a distributed system, comprising the following steps:
constructing a node selection model at a master node of a distributed cluster; wherein the node selection model is used for the master node to select, from the node selection model, served slave nodes and the sequence at which the slave nodes are served;
constructing a request selection model in the slave node; wherein the request selection model comprises weights of designated requests and trade-off parameters set for requests each having a weight greater than a set value; the request selection model is used for each slave node to select, from the request selection model, responded requests and the sequence of the responded requests;
when the distributed system enters the high-load scene, reading, by the master node, the node selection model, and sequentially selecting the served slave nodes according to a time slice round robin policy; and
reading, by each slave node, the request selection model, and sequentially returning data of each request according to the trade-off parameters of each request.

2. The method according to claim 1, wherein the step of constructing a node selection model at a master node of a distributed cluster comprises:
providing a monitor on the master node to monitor the source of each request, the data size of each request, and the total time of each request;
when a load of the system is normal, periodically and statistically analyzing the number of times of requests, the type of the requests, and the data size and average time of the requests of each slave node, and calculating the average number of times of requests, the average data size of the requests and the average total time of the requests of each hour of different slave nodes; and
sorting corresponding slave nodes according to the number of times of requests to form the node selection model.

3. The method according to claim 2, wherein the step of sorting corresponding slave nodes according to the number of times of requests to form the node selection model further comprises:
sorting the corresponding slave nodes according to the number of times of requests, and when the number of times of requests is the same, sorting the corresponding slave nodes according to the average data size of the requests to form the node selection model.

4. The method according to claim 1, wherein the step of constructing a request selection model in each slave node comprises:
setting weights for different requests according to service importance degrees of the different requests;
setting trade-off parameters for each request with a weight greater than or equal to a set threshold; and
sorting corresponding requests according to the sizes of the weights to form the request selection model.

5. The method according to claim 2, wherein before the step of when the distributed system enters the high-load scene, reading, by the master node, the node selection model, and sequentially selecting the served slave nodes according to a time slice round robin policy, the method comprises:
when the distributed system enters the high-load scene, stopping, by the master node, monitoring and calculation on the requests of each slave node.

6. The method according to claim 2, wherein in the step of reading, by the master node, the node selection model, and sequentially selecting the served slave nodes according to a time slice round robin policy, the time slice served by each salve node=(the number of times of requests/the number of total nodes)×the average total time of the requests×$1/N$, where N is an integer greater than 3.

7. The method according to claim 1, wherein the trade-off parameter represents a minimum parameter satisfaction degree for normal service operation.

8. The method according to claim 1, wherein for the same priority level, the slave nodes are sorted according to a first come first served principle.

9. The method according to claim 1, wherein for each request sent to the master node, the weight degrees of requests of each slave node are set according to actual service, and the higher the weight is, the more important the request is to service availability.

10. The method according to claim 1, wherein the slave nodes perform requests according to first come first served policy in a normal situation of the cluster, in a high-load cluster, requests to be sent be sorted according to a priority level of weights.

11. A system for achieving high availability of service under a high-load scene in a distributed system, comprising a master node, several slave nodes, a node selection model construction module and request selection model construction modules;
the node selection model construction module is configured to construct a node selection model at a master node of a distributed cluster; the node selection model is used for the master node to select, from the node selection model, served slave nodes and the sequence at which the slave nodes are served;
request selection model construction module is configured to construct a request selection model in each slave node; wherein the request selection model comprises weights of designated requests and trade-off parameters set for requests each having a weight greater than a set value; and each request selection model is used for each slave node to select, from the request selection model, responded requests and the sequence of the responded requests;
the master node is configured to read the node selection model when the distributed system enters the high-load scene, and sequentially select the served slave nodes according to a time slice round robin policy; and
each slave node is configured to read the request selection model, and sequentially return data of each request according to the trade-off parameters of each request.

12. The system according to claim 11, wherein the node selection model construction module comprises a calculation processor, a node selection model generator and a monitor which is provided on the master node;

the monitor is configured to monitor the source of each request, the data size of each request, and the total time of each request;

the calculation processor is configured to when a load of the system is normal, periodically and statistically analyze the number of times of requests, the type of the requests, and the data size and average time of the requests of each slave node, and calculate the average number of times of requests, the average data size of the requests and the average total time of the requests of each hour of different slave nodes; and the node selection model generator is configured to sort corresponding slave nodes according to the number of times of requests to form the node selection model.

13. The system according to claim 12, wherein the node selection model generator is configured to sort the corresponding slave nodes according to the number of times of requests, and when the number of times of requests is the same, sort the corresponding slave nodes according to the average data size of the requests to form the node selection model.

14. The system according to claim 11, wherein each request selection model construction module comprises a weight setter, a trade-off parameter setter, and a request selection model generator;

the weight setter is configured to set weights for different requests according to service importance degrees of the different requests;

the trade-off parameter setter is configured to set trade-off parameters for each request with a weight greater than or equal to a set threshold; and the request selection model generator is configured to sort corresponding requests according to the sizes of the weights to form the request selection model.

15. The system according to claim 11, wherein wherein for each request sent to the master node, the weight degrees of requests of each slave node are set according to actual service, and the higher the weight is, the more important the request is to service availability.

16. The system according to claim 11, wherein for the same priority level, the slave nodes are sorted according to a first come first served principle.

17. The system according to claim 11, wherein the trade-off parameter represents a minimum parameter satisfaction degree for normal service operation.

18. The system according to claim 11, wherein the master node is further configured to, when the distributed system enters the high-load scene, stop monitoring and calculating on the requests of each slave node.

19. The system according to claim 11, wherein the time slice served by each salve node=(the number of times of requests/the number of total nodes)×the average total time of the requests×1/N, where N is an integer greater than 3.

20. The system according to claim 11, wherein for each request sent to the master node, the weight degrees of requests of each slave node are set according to actual service, and the higher the weight is, the more important the request is to service availability.

* * * * *